United States Patent [19]

Hirosawa et al.

[11] 3,920,617
[45] Nov. 18, 1975

[54] SULFUR-CONTAINING POLYAMINE CURING AGENTS FOR POLYURETHANES AND METHOD FOR MAKING AND USING THE SAME

[75] Inventors: Frank N. Hirosawa, Monterey Park; Ming Hsing Lee, Glendale, both of Calif.

[73] Assignee: Furane Plastics, Inc., Los Angeles, Calif.

[22] Filed: Oct. 26, 1973

[21] Appl. No.: 410,233

Related U.S. Application Data

[62] Division of Ser. No. 60,742, Aug. 3, 1970, abandoned.

[52] U.S. Cl..... 260/77.5 AM; 260/578; 260/75 NM
[51] Int. Cl.[2]......................................... C08G 18/38
[58] Field of Search...260/77.5 AM, 2.5 AM, 75 NM

[56] References Cited
UNITED STATES PATENTS
2,765,341  10/1956  Wirth et al. ................ 260/77.5 AM

*Primary Examiner*—M. J. Welsh
*Attorney, Agent, or Firm*—Kenneth G. Wheeless; Robert P. Auber

[57] ABSTRACT

Sulfur-containing polyamine curing and hardening agents for polyurethane prepolymers and methods for preparing them from thiol-containing aromatic amines and from benzothiazoles. Some of the new compounds are liquid at ambient or mixing temperatures. These are particularly advantageous because they are more uniformly mixed with polyurethane prepolymers, and therefore yield elastomers of improved physical properties at low curing temperatures.

12 Claims, No Drawings

SULFUR-CONTAINING POLYAMINE CURING AGENTS FOR POLYURETHANES AND METHOD FOR MAKING AND USING THE SAME

This application is a divisional application of Ser. No. 60,742, filed Aug. 3, 1970 now abandoned.

BACKGROUND OF THE INVENTION

This invention relates to a new group of sulfur-containing polyamine hardeners in liquid and solid form for use in the production of cured urethane resins, and to processes for their preparation and use.

By the use of these new hardeners for curing diisocyanate compositions, elastomers are formed having improved handling characteristics and improved physical properties.

Polyurethane polymers are formed by reacting a di- or poly-functional isocyanate with polyether polyole or with hydroxyterminated polyesters. In reacting monoisocyanate with a compound containing a simple reactive hydrogen, a single urethane is formed. If the two reactants are bifunctional, the resulting product is polymeric; and if one of the reactants is polymeric, the ultimate product will be a polymer of high molecular weight. Such a compound with reactive isocyanate terminated polymers that may be further chain extended, cross-linked, cured, or hardened to high molecular weight compound is represented, typically, in the following equation:

$$2(O=C=N-R-N=C=O) + HO(R_1Z)_n H =$$

$$O=C=N-R\overset{H}{\underset{|}{N}}-\overset{O}{\underset{||}{C}}-O(R_1-Z)_n-\overset{O}{\underset{||}{C}}-\overset{H}{\underset{|}{N}}-R-N=C=O$$

where R is an alkyl, cycloalkyl, aryl, arakyl or alkene hydrocarbon, $R_1$ represents an ester group or a urethane group, Z represents oxygen or sulfur, and $n$ is an integer large enough so that molecular weight of the pelyalkylene ether, thioether, other-thioether glycol or ester group is at least 400, e.g. from about 400 to about 6,000.

The isocyanate terminated reactive intermediate reaction product is generally known in the industry as (1) an isocyanate terminated prepolymer, (2) a polyurethane prepolymer, or (3) a polyisocyanate prepolymer. The prepolymer which contains an excess of unreacted isocyanate groups may be subsequently chain extended, cross-linked or cured by reacting with polyamine compounds, producing linkage of the substituted area type as, for example, in the following equation:

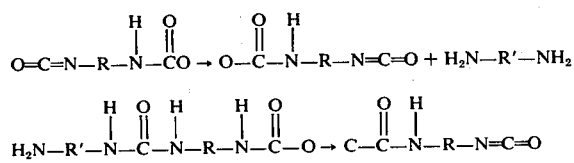

where R and R' represents an alkyl, cycloalkyl, aryl, arakyl or alkene hydrocarbon.

The reaction of the type shown above has been employed in the preparation of the polyisocyanate prepolymers which have viscosities ranging from several hundred centipoises to solid plastic material.

It is generally recognized that aromatic amine cured elastomers will have higher modulus increased tensile strength, better tear strength, greater solvent resistance, and usually require much shorter cure time than glycol cured elastomers.

In spite of the superiority of the commonly used arylene diamine compounds (e.g., 4,4'-methylene bis (2-chloroaniline), and 3,3'-dichlorobenzidine) as curing agents for urethane resins, wherein good physical properties of the final polymers are attained, the use of these materials is attended with certain disadvantages that have limited more widespread acceptance. Specifically, these substances have relatively high melting points, making it difficult to get uniform mixes. The initial mixing is sometimes effected by powdering the curing agent, but even then, due to the elevated melting point, the material must be melted and uniformly dispersed in the polyisocyanate prepolymer which it is intended to cure. This heating to attain melting shortens the working life considerably, and at times, the mixture sets to an insoluble, infusible polymer before it can be mixed properly.

SUMMARY OF THE INVENTION

The reaction of isocyanate with compounds that contain a nitrogen-hydrogen bond has been found to be governed primarily by the basicity or nucleophilicity of the nitrogen-hydrogen bond. The basicity of aromatic amine is decreased when electronegative groups, such as sulfur, halogen atoms or nitro groups are introduced in the nucleus, and especially the ortho-situated groups exert the greatest effect. We have discovered that sulfur is particularly advantageous in this respect. By condensing thiol-containing aromatic amines with an organic compound containing reactive halogen atoms (or other suitable reactive substituents) which are split off by reaction with an alkali metal hydroxide or an alkaline earth metal hydroxide, we have produced the new sulfur-containing polyamine hardeners for polyurethane prepolymers.

One object of this invention is to provide a new type of curing agent containing sulfur for curing polyisocyanate prepolymers. Another object is to provide a curing agent in liquid from for easy uniform mixing with the polyisocyanate prepolymers, which results in optimum properties when cured at the ambient room temperature. A further object is to provide a liquid curing composition that can be used as a hardener, crosslinking agent, or chain extender for polyisocyanate preopolymer compositions so as to produce elastomers having improved handling characteristics and improved physical properties.

Still another object is to provide a liquid curing agent that can be compounded with conventional compounding ingredients such as carbon black, silica, or coloring ingredients, and be subsequently mixed with polyisocyanate prepolymers to form highly useful polyurethane elastomers.

DESCRIPTION OF THE PREFERRED EMBODIMENTS

We have prepared sulfur-containing polyamine compounds of the following formula for reacting with isocyanate terminated prepolymers.

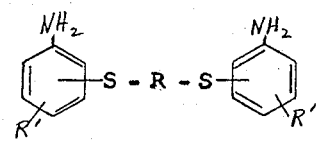

where R is an alkyl, cycloalkyl, aryl, arakyl, or alkene hydrocarbon, or an ester, or a urethane group; and R' may be H, F, Cl, Br, I or a suitable substituent selected from the following: (1) alkyl groups of 1 to 18 carbon atoms in any of their isomeric forms and substituted on the benzene nucleus in the ortho, meta, or para positions; (2) alicyclic groups of 3 to 18 carbon atoms such as cyclopropyl, cyclobutyl, cyclopentyl, cyclohexyl, methylcyclohexyl, etc.; (3) aromatic or arakyl groups of the 6 to 18 carbon atoms such as benzyl, cumyl, etc. This compound may be produced by prereacting a mixture of aminobenzenethiel, alkali metal hydroxide or alkaline-earth metal hydroxide, and an active polyhalogen compound.

The reaction is illustrated in the case of ethylene dichloride as follows:

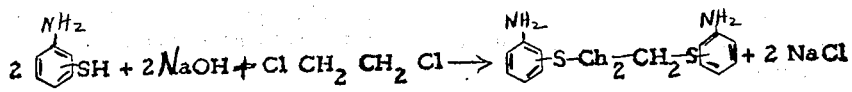

where —SH may be on the ortho, meta, or para position on the benzene nucleus.

We have also found that the final product of the present invention may be obtained effectively by simultaneous alkali metal or alkaline earth metal hydroxide hydrolysis and dehydrohalogenation with accompanying condensation of benzothiazole and active halogen organic compounds as illustrated in the following equation:

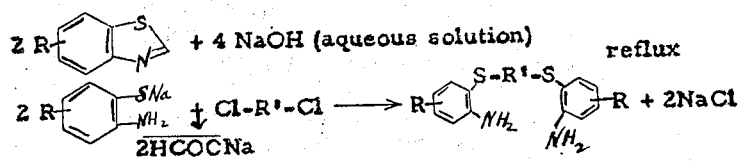

where R' is an alkyl, cycloalkyl, aryl, arakyl or alkylene hydrocarbon, or an ester, or a urethane group; and R may be H, F, Cl, Br, I, or a suitable substituent selected from the following: (1) alkyl groups of 1 to 18 carbon atoms in any of their isomeric forms and substituted on the benzene nucleus in the ortho, meta, or para position: (2) alicyclic groups of 3 to 18 carbon atoms such as cyclopropyl, cyclobutyl, cyclohexyl, methylcyclohexyl, etc.: (3) aromatic or arakyl groups of 6 to 18 carbon atoms such as benzyl, cumyl, etc.

Representative examples of the thiol-containing aromatic amines and thiazole derivatives useful in this invention are:

2-aminobenzene thiol,
4-aminobenzene thiol,
Benzothiazole,
Naptho [1,2] thiazole,
Naptho [2,1] thiazole.

Among the active poly halogen compounds which may be employed in the present invention are: methylene dichloride; 1,1-dichloroethane; 1,2-dichloroethane; 1,2-dichloropropane; 1,3-dichloropropane; 2,3-dichloro-1-propene; 1,2-(or 1,3-; 2,3-) dichlorobutane; 1,3-dichloro-2-butene; 1,4-dichloro-2-butene; 1,4-dichloro-2-butyn; 1,4-(or 2,3-) dichloro- 1,3-butadiene; 1,3-dichloro-2-methyl-2-phenylpropane; 1,2-(or 1,3; 1,4-)-bis(chloromethyl) benzene; 1,3-bis-(chloromethyl)-4,6-dimethylbenzene; bis(-chloromethyl) ether; bis-(2-chloroethyl) ether; bis-(2-chloroisopropyl) ether; bis-(4-chlorobutyl) ether; 1,2-bis-(2-chloroethoxy)ethane; dichloro ethyl formal; dichloromethyl diphenyl oxide; 1,2,3-trichloropropane; 1,1,3-trichloropropane; dihydroxy ester of chloroacetic acid [ClCH$_2$COOROOCCH$_2$Cl] with e.g., ethylene glycol, castor oil, propylene glycol, polyethylene glycol, polytetramethylene ether glycol, etc.; dicarboxylic acid ester of ethylene chlorohydrin 36 ClCH$_2$CH$_2$OOCRCOOCH$_2$CH$_2$Cl] with e.g. adipic acid, azelaic acid, dimer acid, etc.; urethane adduct of ethylene chlorohydrin

[ClCH$_2$CH$_2$OOCNHRNHCOOCH$_2$CH$_2$Cl]

with e.g. 2,4-tolylene diisocyanate, 30/20 mixture of 2,4 and 2,6-tolylene diisocyanate, 4,4'-methylene bis (phenyl isocyanate) etc.; polyurethane adduct of ethylene chlorohydrin

[ClCH$_2$CH$_2$OOCNHRNHCOOR'COONHRNH-COOCH$_2$CH$_2$Cl]

dichloropolyethylene oxide [Cl(CH$_2$CH$_2$O)$_n$CH$_2$CH$_2$CL]; dichloropolypropylene oxide [ClCH(CH$_3$)CH$_2$O(CH$_2$CH(CH$_3$)O)$_n$CH$_2$CH(CH$_3$)Cl]; dichloropolytetramethylene ether [Cl(CH$_2$CH$_2$CH$_2$CH$_2$O)$_n$CH$_2$CH$_2$CH$_2$CH$_2$Cl].

Although the examples given above have been directed to the use of chlorine compounds, it is obvious that the other halogen compounds such as bromine, iodine, or fluorine, are equally applicable in this invention.

For the preparation of the novel hardener composition, the appropriate amount of an aminobenzenethiol was placed in a reaction vessel and an appropriate amount of aqueous solution of alkali metal or alkaline-earth metal hydroxide was slowly added over a period ranging from 0.5 to 2 hours. After the completion of the first stage of the reaction, an appropriate amount of reactive poly halogen compound was slowly added over a period ranging from 0.5 to 4 hours. After the completion of the second stage of the reaction, the mass was refluxed over a period of 1 to 24 hours to complete the reaction, and the hardener purified in the usual manner which includes removing the salt water by washing, and stripping of water and unreacted materials under reduced pressure.

In another method for the preparation of the novel hardener compositions, the appropriate amount of benzothiazole was placed in a reaction vessel, and an appropriate amount of aqueous solution of alkali metal or alkaline-earth metal hydroxide was added, and refluxed for a period ranging from 1 to 10 hours. After the completion of the hydrolysis reaction, an appropriate amount of reactive poly-halogen compound was slowly added over a period ranging from 0.5 to 4 hours and the refluxing continued for a period ranging from 1 to 24 hours to complete the reaction. The hardener was purified in the usual manner which includes removing the salt water by washing, and stripping off water and unreacted materials under reduced pressure. The product obtained was usually of such purity it needed no further purification prior to use for its intended purpose.

The cured polyurethane polymers of this invention have many applications. They are particularly useful for potting and encapsulation of electrical equipment, for solid tires, for mechanical goods, such as sealing rings, packing gaskets, mountings, matting, printing ink rollers, etc.

The preparation of the novel sulfur-containing polyamine and the use of such curing agents will be further illustrated by the following specific examples, but it will be understood that the invention is not limited thereto. The reactants, their proportions and the specific ingredients of the formulations are presented as being typical, and various modifications may be made in view of the foregoing disclosure. Unless otherwise specified, parts and percentages are by weight.

EXAMPLE 1

A 500 ml., 3 neck reaction flask, equipped with a mechanical stirrer and reflux condenser was charged with 125 grams (1 mole) of 2-aminobenzenethiol (2-ABT). With good agitation and cooling, a solution of 40 grams (1 mole) of sodium hydroxide in 60 grams of water was slowly added over a period ranging from 5 to 20 minutes. The addition was controlled so that the reaction temperature did not rise over 95°–100°C. To the above sodium-2-aminobenzenethiol (Na-2-ABT) solution, 50 grams (0.506 mole) of ethylene dichloride was added over a period of 3 hours at pot temperature of 90°–95°C. After the addition, the mixture was reacted at 100°–105°C. for an additional 4 hours. Water (200 ml.) was then added and stirred for a few minutes and phase separated. The aqueous salt solution was discarded and the organic layer was washed 2 times with 100 ml. portion of water and distilled under reduced pressure of 25 mm. to pot temperature of 130°C. The distillation residue was filtered while hot to remove the residual salt. The filtrate, weighing 274.7 grams (99% of the theoretical yield), a yellowish white solid, recrystallized 3 times from methanol, a white solid had a melting point of 75.5°–76.5°C.

| Analysis Calcd. for $C_{14}H_{16}N_2S_2$ | | | | |
|---|---|---|---|---|
| | C% | H% | N% | S(by difference) |
| Calcd. | 60.86 | 5.79 | 10.10 | 23.21 |
| Found | 60.62 | 5.82 | 9.99 | 23.57 |

EXAMPLE 2

In a 500 ml., 3 neck reaction flask, equipped with a mechanical stirrer, thermometer, and reflux condenser, a mixture of benzothiazole (135 grams, 1 mole) and aqueous NaOH solution (82 grams NaOH/225 ml. water) was heated to reflux. The hydrolysis was carried out at reflux temperature of 113°–119°C. for 4 hours. After the completion of the hydrolysis, the mixture was cooled to about 65°C. To this, without external heating, ethylene dichloride (51 grams, 0.514 mole) was added dropwise through the reflux condenser over a period of 30 minutes. After the addition, the mixture was heated to reflux temperature (97°–113°C.) for 2 hours. Organic layer was then separated while hot and washed 3 times with 250 ml. portion of boiling water. The oily crude product thus obtained weighed 135 grams (98% yield), crystallized into a yellowish white solid with melting point of 72°–74°C.

EXAMPLE 3

A 500 ml., 3 neck reaction flask, equipped with a mechanical stirrer, thermometer, and reflux condenser was charged with 125 grams (1 mole) of 2-ABT. With good stirring and cooling, a solution of 40 grams (1 mole) of sodium hydroxide in 60 grams of water was slowly added over a period of 5 to 10 minutes. The addition was controlled so that the final addition temperature remained below 100°C. To the above Na-2-ABT solution, 43 grams (0.506 mole) of methylene chloride was added over a period of 3 hours at pot temperature of 70°–75°C. After the addition, the mixture was reacted at 100°–105°C. for 4 hours. 100 ml. of water was then added and stirred for a few minutes at 60°–80°C. and phase separated. The aqueous salt solution was discarded and the organic layer washed twice with 100 ml. portion of water and distilled under reduced pressure of 25 mm. to pot temperature of 130°C. The distillation residue was filtered while hot to remove the residual salt. The low viscosity, dark tan colored filtrate weighed 112 gm. (85.5% yield).

EXAMPLE 4

Five moles of Na-2-ABT solution as prepared in EXAMPLE 1, 300 grams (2.65 moles) of 1,2-dichloropropane was reacted at 65°–89°C. for 30 minutes and the mixture was refluxed 20 hours at temperature of 93°–108°C. The reaction mixture was purified as in EXAMPLE 1 to obtain 652 grams (90% yield) of brown liquid of the following physical properties: Brookfield viscosity, 1,510 cps (25°C.); $n_D^{25}$, 1.6621; $D_{25}^{25}$, 1.195; Amine eq. wt. 145 (theo. 145).

| Analysis Calcd. for $C_{13}H_{18}N_2S_2$ | | | | |
|---|---|---|---|---|
| | C% | H% | N% | S (by difference) |
| Calcd. | 62.06 | 6.20 | 9.65 | 22.09 |
| Found | 62.10 | 6.08 | 9.42 | 22.40 |

EXAMPLE 5

A mixture of benzothiazole (540 grams, 4 moles) and aqueous NaOH solution (328 grams NaCH/900 grams water) was heated to reflux (113°–119°C.) and refluxed at this temperature for 2 hours. To this, 235 grams (2.08 moles) of 1,2-dichloropropane was added over a period of 4 hours at pot temperature of 90°–100°C. and the mixture was reacted at 100°–110°C. for 17 hours to obtain 494 grams of compound similar to compound obtained in EXAMPLE 4 with the following physical characteristics: Brookfield viscosity, 2,390 cps., (25°C.); $D_{25}^{25}$ 1.202; $n_{25}$, 1.6643; Amine eq. wt. 148.

EXAMPLE 6

The curing agent prepared as in EXAMPLES 1 to 5 above may be mixed with a polyisocyanate prepolymer and the mass cured at room temperature or slightly above room temperature to provide a resilient, tough, rubber-like elastomer.

The liquid polyisocyanate prepolymer used as described above with the new curing agent consisted of the reaction product of (1) polytetramethylene ether glycol (PTMEG, manufactured by Quaker Oats Co.), and (2) an 80/20 mixture of 2,4- and 2,6-tolylene diisocyanate, the proportions one to two moles by weight.

The polymeric polyols which may be used to prepare the isocyanate-terminated prepolymer include the polyalkylene ether glycols; the polyalkylenearylehe ether glycols; the hydroxy terminated polyesters, such as polyethylene adipate, polyethylene aebacate, and the like. The polyol may be represented by the formula: $HO(RO)_nH$ where R is either an alkylene radical containing up to 10 carbon atoms, or alkylene-arylene ester group containing molecule and n is an integer sufficiently large so that the molecular weight of the polymeric polyol is about 400 to 6000.

Any of a wide variety of organic diisocyanate may be employed to prepare the polyisocyanate prepolymer. Suitable compounds include: 2,4-tolylene diisocyanate; 1,5-naphthalene diisocyanate; m-phenylene diisocyanate; 3,3'-dimethyl-4,4'-biphenylene diisocyanate; 4,4'-methylene bis(phenyl isocyanate), and the like.

Comparative physical properties of the urethane elastomers cured with these hardeners and MOCA (4,4'-methylene bis(2-chloroaniline are listed in Table I.

Twenty-three parts of this hardener mixed thoroughly with 100 parts of polyisocyanate prepolymer (amine eq. wt. 650), gave a polyurethane elastomer of excellent physical properties.

EXAMPLE 9

Following the procedure described in EXAMPLE 1, substituting bis(2-chloroethyl)ether for ethylene dichloride, gave an 80.5% theoretical yield of low viscosity brown liquid. Twenty-three parts of this hardener were mixed thoroughly with 100 parts of polyisocyanate prepolymer (amine eq. wt. 650), yielding a polyurethane elastomer of excellent physical properties.

EXAMPLE 10

Following the procedure described in EXAMPLE 1, 1,2,3-trichloropropane (75 grams, 0.508 mole) was added into a solution of Na-2-ABT (1.5 moles) over a period of 1.5 hours at a pot temperature of 80°–85°C. The mixture was further reacted at 100°–110°C. for 16 hours. 187 grams (90.5% yield) of low viscosity brown liquid was obtained after the purification. This hardener when cured with polyisocyanate prepolymer (eq. wt. 658), had a Shore A hardness of 55–60 and had a working life of approximately 30 minutes at ambient room temperature.

TABLE I

| Polyisocyanate Prepolymer | Eq. Wt. | Curing Agent | Amount PBW 100 PBW | Working Life | Hardness Shore A | Tensile Strength psi | Elongation % | Tear Strength |
|---|---|---|---|---|---|---|---|---|
| 8158-A | 675 | MOCA | 19.8 | 10 min. at 65°C. | 94 | 4830 | 390 | 650 |
| 8158-A | 675 | Exp. 4&5 | 21.5 | 20 min. at 25°C. | 75 | 7630 | 570 | 380 |
| 8666-A | 375 | Exp. 4&5 | 38.6 | 60 min. at 25°C. | 75 (D) | 4350 | 230 | 930 |
| 5741-A | 658 | " | 22 | 25 min. at 25°C. | 83 | 4435 | 340 | 490 |
| 5712-A | 675 | " | 21.6 | 20 min. at 25°C. | — | 3640 | 570 | 190 |
| 5721-A | 1300 | " | 11.6 | 20 min. at 25°C. | — | 4270 | 570 | 180 |
| 8158-A | 675 | Exp. 1&2 | 20.5 | 25 min. at 25°C. | 75 | Comparable with Example 2 | | |
| 8158-A | 675 | Exp. 3 | 19.4 | 30 min. at 25°C. | 85 | " | | |

EXAMPLE 7

Following the procedure described in EXAMPLE 1, substituting 1,4-dichlorobutane (64.5 grams, 0.507 mole) for ethylene dichloride, a product of a light brown low viscosity liquid was obtained with a theoretical yield of better than 95%. This hardener, when cured with an equivalent weight of polyisocyanate prepolymer having an amine equivalent weight of 650, gave a Shore "A" hardness of 73, and had a working life of better than 20 minutes.

EXAMPLE 8

Following the procedure described in EXAMPLE 1, substituting 1,4-dichlorobutene-2 for ethylene dichloride, yielded a product with m.p. 64°–68°C. (theoretical yield of 98.5%).

| Analysis Calculated for $C_{16}H_{18}N_2S_2$ | | | |
|---|---|---|---|
| | C% | H% | N% | S (by difference) |
| Calculated | 63.57 | 5.98 | 39.24 | 21.21 |
| Found | 65.41 | 6.06 | 8.76 | 19.77 |

EXAMPLE 11

Following the procedure described in EXAMPLE 1, substituting 140 grams (0.502 mole) of chloromethylated diphenyloxido (Dow Chemical's CMDPO-25) for ethylene dichloride, yielded 215.5 grams (97% yield) of soft yellow solid composition. This also gave a hard urethane elastomer of excellent physical properties.

EXAMPLE 12

An adduct of the following structure was prepared:

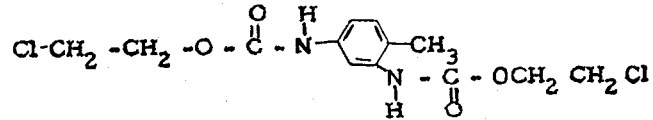

by addition of distilled ethylene chlorohydrin (67 grams, 0.83 mole) to distilled 2,4-tolylene diisocyanate (69 grams, 0.39 mole) and the mixture was reacted at 85°–90°C. for 1.5 hours. The crude product (100% yield) was recrystallized once from benzene to give a crystal with m.p. of 93°–95° C.

The adduct prepared as above (50.3 grams, 0.15 mole) was reacted with 0.316 mole of Na-2-ABT solution at a temperature of 110°–114°C. for 3 hours to give 74.5 grams (97% yield) of viscous hardener. The amine equivalent weight was 268 (theo. 256). Twenty-seven parts of this compound were thoroughly mixed with 65 parts of polyisocyanate prepolymer (eq. wt. 650), and had Shore A hardness of 85 and working life of better than 50 minutes.

EXAMPLE 13

An adduct of the following structure was prepared:

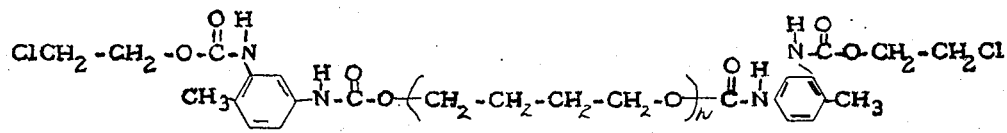

by reacting polyisocyanate prepolymer (130 grams, 0.2 mole) and 19 grams (0.223 eq.) of ethylene chlorohydrin at 85°–90° C. for 4 hours. A solution of Na-2-ABT (0.106 mole) was mixed with a solution of above adduct (73 grams, 0.05 mole) in 50 ml. of toluene and refluxed for 3 hours at 94–98°C. The product thus obtained was a light brown, viscous, resinous composition weighing 75.5 grams (92.5% yield), and had an amine equivalent weight of 1015. This hardener when cured with an equivalent weight of polyisocyanate prepolymer (amine eq. wt. 650), gave Shore A hardness of 55, and had a working life of better than 1 hour.

EXAMPLE 14

Following the procedure described in EXAMPLE 1, substituting 1,2-bis(2-chloroethoxy)ethane (200 grams, 1.07 moles) for ethylene dichloride, yielded 363 grams (99% theo.) of dark brown liquid, Brookfield viscosity of 750 cpa. at 25°C. Twenty parts of this hardener were mixed thoroughly with 100 parts of polyisocyanate prepolymer (amine equivalent of 650) and a mixture was obtained that had a pourable consistency, a working life of 25 minutes at 75°F., compared with an equivalent cure prepared from dry powdered MOCA (4,4'-methylene bis(2-chloroaniline), which had a working life of 10 minutes at 65°C. Both products showed comparable tensile strength but with the curing agent of above Example 14 had an elongation of 560% compared to the MOCA cure of 350%.

EXAMPLE 15

Following the procedure described in EXAMPLE 2, substituting 1,4-dichlorobutane (64.5 grams, 0.507 mole) for ethylene dichloride, yielded a product of brown, low viscosity liquid, which when reacted with the prepolymer, gave a polyurethane elastomer having physical properties comparable to samples cured as described in Example 7.

Although the discussion and the examples have been directed to the hydrolysis treatment of benzothiazoles and of the 2-aminobenzenethiol in the form of its sodium salt, it is obvious that the reaction procedure of this application is equally as applicable to the ether alkali metal salts, particularly the potassium salt.

We claim:

1. The process of curing an isocyanate terminated urethane prepolymer which comprises curing an isocyanate terminated urethane prepolymer with at least one compound selected from those of the formula:

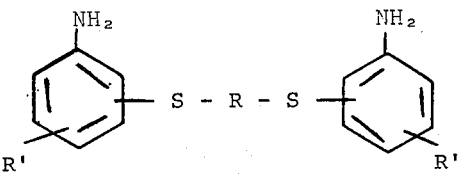

wherein R is a hydrocarbon, and R' is selected from the group consisting of hydrogen, halogens, and hydrocarbons.

2. The process of curing urethane as claimed in claim 1 wherein said R' is hydrogen.

3. The process of curing urethane as claimed in claim 2 wherein said R is alkyl.

4. The process of curing urethane as claimed in claim 3 wherein at least one cross-linking agent is bis(o-aminophenylthio)methane.

5. The process of curing urethane as claimed in claim 3 wherein at least one cross-linking agent is bis(o-aminophenylthio)ethane.

6. The process of curing urethane as claimed in claim 3 wherein at least one cross-linking agent is bis(o-aminophenylthio)-1,2 propane.

7. The process of making an elastomeric polyurethane plastic which comprises mixing an organic compound having reactive hydrogen atoms as determined by the Zerewitinoff method having a molecular weight of at least about 500, an organic polyisoyanate thereby forming a prepolymer, and curing said prepolymer by mixing therein at least one curing agent of the formula:

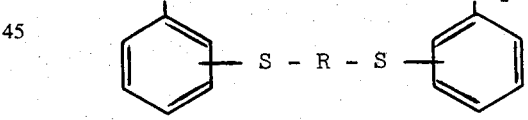

wherein R is a hydrocarbon.

8. The process as claimed in claim 7 wherein said R is aryl.

9. The process as claimed in claim 7 wherein said R is alkyl.

10. The process as claimed in claim 7 wherein at least one cross-linking agent is bis(o-aminophenylthio)ethane.

11. The process as claimed in claim 7 wherein at least one cross-linking agent is bis(o-aminophenylthio)ethane.

12. The process as claimed in claim 7 wherein at least one cross-linking agent is bis(o-aminophenylthio)-1,2 propane.

* * * * *